United States Patent [19]
Bentley

[11] 4,240,907
[45] Dec. 23, 1980

[54] DIALYZER AND METHOD OF DIALYSIS

[75] Inventor: Donald J. Bentley, Newport Beach, Calif.

[73] Assignee: Bentley Laboratories, Inc., Irvine, Calif.

[21] Appl. No.: 4,486

[22] Filed: Jan. 18, 1979

Related U.S. Application Data

[63] Continuation of Ser. No. 813,455, Jul. 7, 1977, which is a continuation-in-part of Ser. No. 708,074, Jul. 23, 1976, abandoned.

[51] Int. Cl.$^3$ .................. B01D 31/00; B01D 13/00
[52] U.S. Cl. .................. 210/646; 210/321.3; 210/494.2
[58] Field of Search ........... 55/158; 210/22 A, 321 B, 210/494; 422/48

[56] References Cited
U.S. PATENT DOCUMENTS

| | | | |
|---|---|---|---|
| 3,442,002 | 5/1969 | Geary, Jr. et al. | 55/158 X |
| 3,536,611 | 10/1970 | DeFilippi et al. | 210/22 A |

FOREIGN PATENT DOCUMENTS 1175124  12/1969  United Kingdom ................ 210/34 B Primary Examiner—Frank A. Spear, Jr.
Attorney, Agent, or Firm—Lyon & Lyon

[57] ABSTRACT

An apparatus and method for blood dialysis. The device includes a plurality of semipermeable tubules for transporting blood therethrough. Distribution means are positioned adjacent the exterior of the tubules for admitting a dialysis solution which is passed along the outside of the tubules. The tubules are preferably arranged in a configuration such that the packing density of the tubules is between about 20% and about 50%, and preferably between about 25% and about 35%. This packing density insures adequate distribution of the dialysate solution as it is passed along the length of the tubules. The tubules may be wrapped and similarly curved; in a preferred embodiment they are spirally orientated. The configuration of the tubules allows for the movement of the tubule in a predetermined manner such that tubule masking is substantially prevented.

4 Claims, 7 Drawing Figures

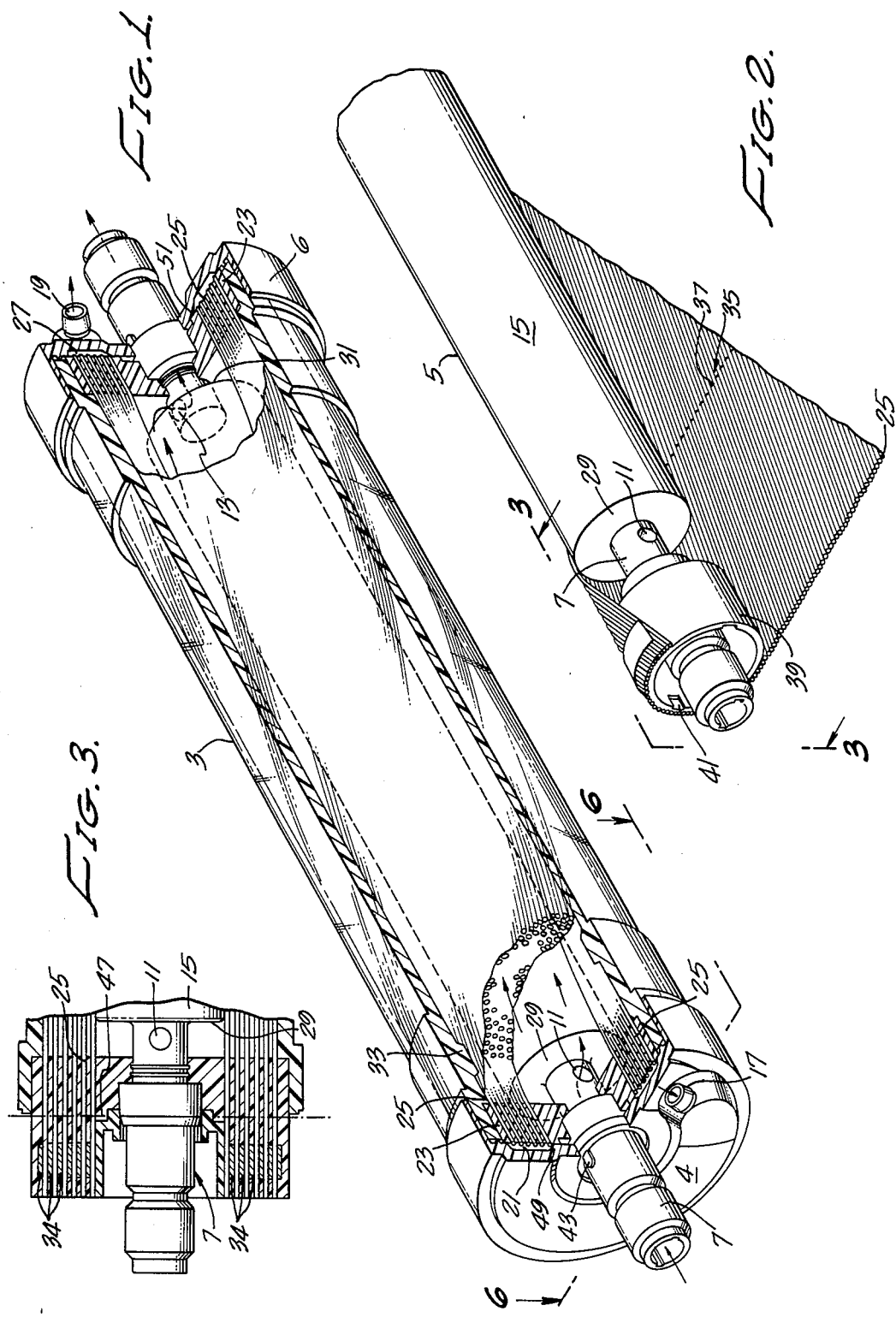

DIALYZER AND METHOD OF DIALYSIS

RELATED APPLICATIONS

This application is a continuation of U.S. Patent application Ser. No. 813,455, filed July 7, 1977 which in turn is a continuation-in-part of U.S. Patent application Ser. No. 708,074, filed July 23, 1976, both now abandoned.

BACKGROUND OF THE INVENTION

The present invention relates to hollow fiber tubular kidney dialyzers.

Kidney dialyzers function to remove toxic substances from the blood of patients suffering from renal failure. The dialyzers are fabricated with semipermeable membranes and dialysis is accomplished by flowing blood along one side of the membrane and a dialysate solution along the other side. During the dialyzing process, metabolites such as urea, uric acid, creatine, phosphorous and calcium in the blood diffuse from the blood to the dialysate solution through the membrane due to the lower concentration of metabolites in the dialysate solution.

Prior hollow fiber tubular kidney dialyzers comprised a bundle of several thousand individual microtubules, each consisting of a semipermeable material such as cellophane or Cuprophan ®. The tubules were positioned in a cylindrical container and supported in a generally parallel orientation between two support members disposed at each end of the container. FIG. 4 illustrates this prior dialyzer tubule configuration. The blood was circulated through the tubules and the dialysate solution was circulated through the container around the outside of the tubules. To maximize the efficiency of the dialyzer, a great number of tubules were positioned within the container. Unfortunately, the high packing density and the randomly parallel orientation of tubules forced many tubules to mask, or come into contact with other tubules, precluding dialysis through the contiguous surfaces and thereby reducing the efficiency of the dialyzer. Furthermore, the tubules of the dialyzer expanded and contracted with changes in ambient temperature and humidity. The expansion of the tubules caused disruption of their original generally parallel orientation resulting in a more random and disordered positioning of the tubules. In this random orientation, there was even greater masking of the tubules which further reduced the efficiency of the dialyzer. Further, during operation of the dialyzer, the random orientation of the tubules caused the bunching of tubules with the accompanying formation of localized areas of low flow of dialysate solution within the dialyzer thereby even further reducing the efficiency of the dialyzer.

An object of the present invention is to provide an improved dialyzer and method of operation. Other objects and advantages of this invention will become apparent on a reading of the entire specification, including the drawings and claims.

SUMMARY OF THE INVENTION

This invention provides an apparatus and method for blood dialysis wherein the efficiency of transfer across hollow fiber tubules is increased due to the tubule configuration. The tubules are positioned in similarly curved configuration in order that they will all expand and contract in a uniform predetermined manner so as to prevent masking of adjacent tubules. Further, the tubules have a packing density of between about 20% and about 50%, and preferably between about 25% and about 35%. This increased packing density allows for more uniform distribution of the dialysate solution.

DESCRIPTION OF THE DRAWINGS

FIGS. 1 and 3 are partial cross-sectional views illustrating the device of this invention.

FIG. 2 is a pictorial view illustrating the device of this invention.

DESCRIPTION OF PREFERRED EMBODIMENTS

Figure 4:
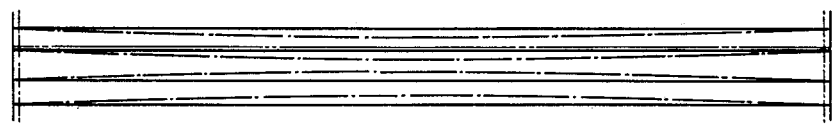
FIG. 4 is a schematic drawing illustrating a prior art device.

Referring now to FIG. 1, the dialyzer, generally referred to as 1, and its method of operation will be discussed. The dialyzer 1 includes a dialyzer housing 3 disposed about a central core 5. The core 5 has a dialysate inlet 7 and a dialysate outlet 9. The dialysate inlet 7 and outlet 9 are provided with a plurality of apertures 11 and 13, respectively, positioned adjacent a point where the dialysate inlet and outlet about a cylindrical section 15 of the central core 5 which prevents the dialysate flow from passing through the cylindrical portion 15 of the central core 5 and forces the dialysate to flow outward through apertures 11 and into apertures 13 prior to exiting the dialyzer 1 at the dialysate outlet 9.

The dialyzer 1 is further defined as including a tangential blood inlet 17 and a tangential blood outlet 19. A blood inlet chamber 21 is formed between the dialyzer cap 4, the exterior of the tubular dialysate inlet 7 and a suitable potting compound 23 within which a number of hollow fiber tubules 25 are secured. Similarly, the annular blood outlet chamber 27 is bounded by dialysate cap 6, the exterior of the tubular portion of the dialysate outlet 9 and potting compound 23 within which the tubules 25 are secured adjacent the blood outlet chamber 27.

As shown in FIG. 2, a plurality of similarly curved and spirally oriented semipermeable hollow fiber tubules 25 are wrapped about the central core 5 such that Their opposed ends may be secured in an annular ring of potting compound 23. The front and rear ends of the tubules 25 are preferably manufactured such that they have a rounded edge in order to prevent blood trauma upon entrance and exit from the dialyzer 1.

As the thickness of the annular ring of layers of tubules 25 increases as the wrapping continues, tubules 25 nearer the central core 5 are spiralled more than those more toward the outside of the wrap. This produces a nonparallel tubule relationship which increases flow shear as between adjacent layers of tubule wrap and promotes dialysate distribution and flow about the tubules 25 and transfer across the tubules.

Dialysate outlet apertures 11 are thus positioned between a front face 29 of the cylindrical portion 15 of the central core 5 and the annular ring of potting compound 23. Similarly, the dialysate outlet apertures 13 are positioned between a rear face 31 of the cylindrical portion 15 of the central core 5 and the annular ring of potting compound 23 located at the blood outlet of the tubules 25.

Preferably, a compression means such as an inner flange 33 is positioned near the juncture of the dialysate inlet apertures 11 and the central core cylindrical portion 15 in order to increase the packing density of the tubules 25 in the area of the compression means. The tubules 25 are separated from each other and having a packing density of between about 20% and about 50%, and preferably between about 25% and about 35%. The packing density of the tubules at the flange means 33 is greater than that of the packing density of the balance of the tubules' length, and may be as high as 100%.

Figure 7:
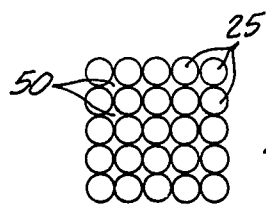
FIG. 7 is a partial cross-sectional view illustrating the definition of the term "packing density" as used to describe the device of this invention.
Figure 6:
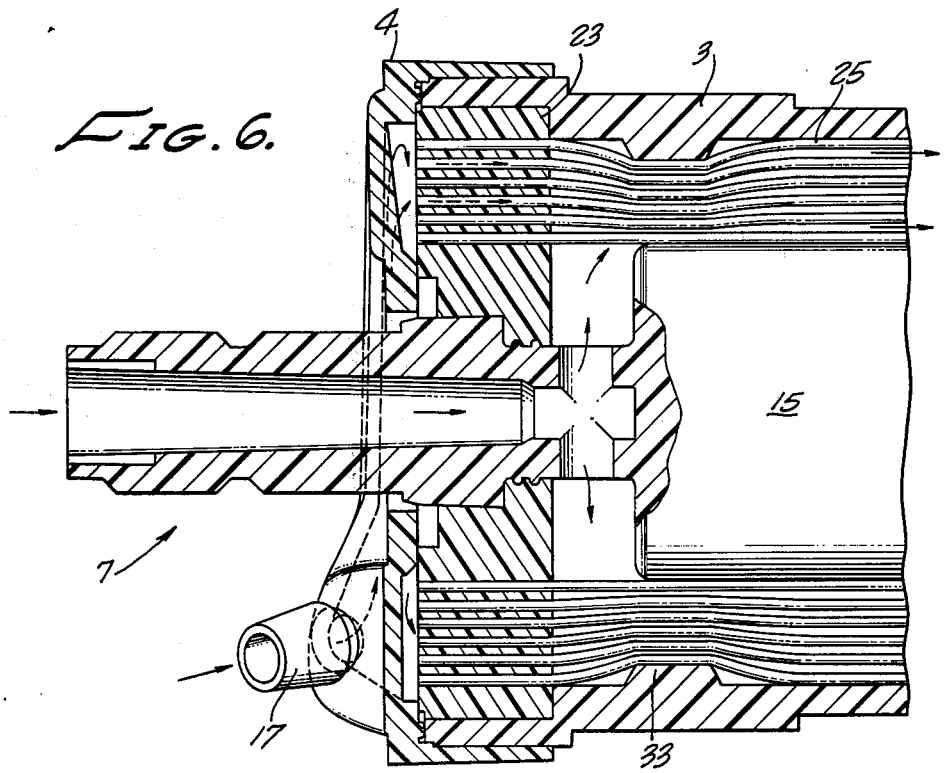
FIG. 6 is a partial cross-sectional view illustrating the device of this invention.

Referring now to FIG. 7, the term "packing density" as utilized in this disclosure will be explained. FIG. 7 shows a plurality of tubules 25 arranged in contiguous relationship such that each tubule is touching the other tubules adjacent it. Such a configuration produces a number of voids designated as 50 in FIG. 7, due to the generally oval configuration of the tubules 25. If the tubules are compressed beyond the configuration of FIG. 7, the tubules will be deformed. Accordingly, the contiguous relationship illustrated in FIG. 7 is defined as illustrating a packing density of 100%. The packing densities referred to in this disclosure are defined relative to the 100% packing density configuration shown in FIG. 7.

Referring now to FIGS. 2 and 3, the method of making such a dialyzer will be discussed. A plurality of tubules 25 are configured in a mat or belt 35 wherein the individual tubules 25 have fiber 37 interwoven within the tubules 25 in order to maintain their lateral spacing. The belt or mat 35 is then wrapped about the central core 5 and a cylinder 39 having an external diameter approximately equal to that of the cylindrical portion 15 of the core 5. When the last layer of mat or belt 35 has been wrapped about the core 5, the tubules may be held in place temporarily by means of an adhesive strip 33. Member 39 is held in place about the tubular portion of the dialysate inlet by means of a keyway slot 41 which engages a key 43 along exterior of the tubular dialysate inlet 7. As shown in FIG. 3, a cap member (not shown) may then be placed about each end of the dialyzer 1 engaging the ends of the tubules 25. A potting compound is then inserted into and about the area surrounding the tubules 25 between the cap member and the exterior of the tubular dialyzer inlet and outlet 7 and 9, respectively. Preferably, the potting compound consists of a liquid resin which sets upon exposure to air and/or heat. The dialyzer assembly 1 is then rotated about its axis in order to urge the potting compound through centrifugal force to each end of the dialyzer assembly 1. After the potting compound is set up, the ends of the assembly are partially cut as shown by line 47 in order to produce the outward faces 49 and 51 of the annular rings of potting compound 23.

Figure 5:
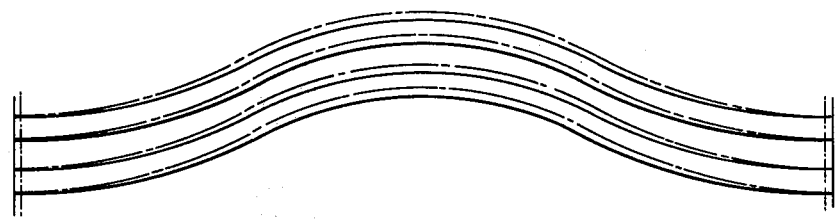
FIG. 5 is a schematic drawing illustrating the device of this invention.

Referring now to FIGS. 4 and 5, the advantages of the curved configuration of the tubules 25 will be discussed in detail. FIG. 4 shows a number of tubules secured at each end in the configuration typical of prior dialyzer applications. The dotted lines indicate possible movement of the tubules upon expansion. In contrast, FIG. 5 illustrates movement due to expansion, again shown as dotted lines, of tubules which are arranged in a curved configuration. As may be seen in FIG. 5, each of the tubules expands in the same direction due to the fact that the tubules are predisposed to move in such a direction by means of the initial curvature of the tubules. While FIGS. 4 and 5 illustrate movement in two planes, it is to be understood that the spiral or helix configuration of the tubules 25 as shown in FIGS. 1 and 2 produce a three-dimensional predetermined configuration and allow for the tubules to move in expansion or contraction in a predetermined spaced apart relationship.

While an embodiment and application of this invention have been shown and described, it will be apparent to those skilled in the art that modifications are possible without departing from the inventive concepts described herein. This invention, therefore, is not to be restricted or limited save by the claims appended hereto.

What is claimed is:

1. A method of waste containing blood flow dialysis comprising:
   tangentially admitting blood into a dialyzer blood inlet chamber;
   passing said blood from said blood inlet chamber into and through a plurality of similarly spirally oriented semipermeable tubules packed between the dialyzer housing and a central dialyzer core;
   passing blood wastes through the walls of said tubules into said dialysate;
   passing the treated blood from said tubules into a dialyzer blood outlet chamber;
   longitudinally restraining said tubules between said dialyzer blood inlet chamber and said blood outlet chamber;
   tangentially removing said treated blood from a dialyzer blood outlet chamber;
   radially distributing a fresh dialysate about the exterior of said tubules;
   passing in a generally spirally manner said dialysate along the exterior of said tubules; and
   radially removing said dialysate and blood wastes from said dialyzer.

2. The method claimed in claim 1 wherein said tubules are further defined as having a packing density of between about 20% and 50%.

3. A helical flow dialyzer comprising:
   a dialyzer housing disposed about a central core, said core including a tubular dialysate inlet and a tubular dialysate outlet, both said dialysate inlet and outlet being provided with a plurality of apertures and being joined by a cylindrical section of said central core for preventing dialysate flow through said cylindrical portion and for forcing dialysate flow through said apertures of said dialysate inlet and outlet;
   an annular blood inlet chamber and an annular blood outlet chamber formed within said dialyzer housing about said tubular dialysate inlet and outlet, respectively, said inlet chamber having a tangential inlet nozzle and said outlet chamber having a tangential outlet nozzle;
   a belt made up of similarly helically oriented semipermeable tubules, wrapped about said central core, opposed ends of said tubule belt being secured in an annular ring of potting compound formed about a portion of said dialysate inlet and outlet such that said dialysate inlet and outlet apertures are located within an enclosure formed by said dialyzer housing, said central core and said annular potting rings, said annular rings forming a portion of said blood inlet and blood outlet chambers, said ends of said hollow fibers passing through said annular rings for communication with said blood inlet and outlet chambers; and a compression means positioned near the juncture of said dialysate inlet and said central core cylindrical portion between said dialyzer housing and said central core and about said tubules for increasing the packing density of said tubules in the area adjacent said compression means.

4. The helical flow dialyzer claimed in claim 3 wherein said tubules are further defined as having a packing density of between about 20% and 50%.

* * * * *